US012726117B2

(12) United States Patent
Qiu

(10) Patent No.: US 12,726,117 B2
(45) Date of Patent: Sep. 1, 2026

(54) VOLTAGE BOOSTER AND VOLTAGE BOOSTER SYSTEM

(71) Applicant: Infineon Technologies AG, Neubiberg (DE)

(72) Inventor: Yuqiang Qiu, Qingdao (CN)

(73) Assignee: Infineon Technologies AG, Neubiberg (DE)

( * ) Notice: Subject to any disclaimer, the term of this patent is extended or adjusted under 35 U.S.C. 154(b) by 200 days.

(21) Appl. No.: 18/609,570

(22) Filed: Mar. 19, 2024

(65) Prior Publication Data

US 2024/0333147 A1 Oct. 3, 2024

(30) Foreign Application Priority Data

Mar. 31, 2023 (DE) ......................... 102023108367.8

(51) Int. Cl.
*H02M 3/07* (2006.01)
*H02J 3/32* (2026.01)
(Continued)

(52) U.S. Cl.
CPC ................. *H02M 3/07* (2013.01); *H02J 3/32* (2013.01); *H02J 3/38* (2013.01); *H02M 1/32* (2013.01);
(Continued)

(58) Field of Classification Search
None
See application file for complete search history.

(56) References Cited

U.S. PATENT DOCUMENTS

2005/0200133 A1 9/2005 Wobben
2007/0044837 A1 3/2007 Simburger et al.
(Continued)

FOREIGN PATENT DOCUMENTS

CN 109742948 A 5/2019
CN 210518100 U 5/2020
(Continued)

OTHER PUBLICATIONS

Fang Zhang Peng, Z-source inverter, Apr. 30, 2003, IEEE, vol. 39 Issue 2, p. 504-510 (Year: 2003).*
(Continued)

*Primary Examiner* — Crystal L Hammond
*Assistant Examiner* — Seung Ho Choi
(74) *Attorney, Agent, or Firm* — Harrity & Harrity, LLP

(57) ABSTRACT

The disclosure relates to a voltage booster. The voltage booster includes an inductor, an output capacitor branch including an upper output capacitor and a lower output capacitor, at least one switching branch, each including a first upper switch and a first lower switch, an upper protection branch arranged between the inductor and the at least one switching branch and including an upper protection capacitor and an upper protection diode, an output voltage rectification branch arranged between the at least one switching branch and the output capacitor branch, and a lower protection diode arranged between the at least one switching branch and the output capacitor branch, wherein the upper protection branch is arranged in parallel with the first upper switch, and wherein the lower protection diode is arranged to form a lower protection branch with the lower output capacitor parallel to the first lower switch.

15 Claims, 13 Drawing Sheets

(51) Int. Cl.
*H02J 3/38* (2026.01)
*H02M 1/32* (2007.01)
*H02J 101/24* (2026.01)
*H02J 101/28* (2026.01)

(52) U.S. Cl.
CPC ....... *H02J 2101/24* (2026.01); *H02J 2101/28* (2026.01)

(56) References Cited

U.S. PATENT DOCUMENTS

| | | | |
|---|---|---|---|
| 2012/0019230 | A1 | 1/2012 | Frisch et al. |
| 2014/0369093 | A1 | 12/2014 | Park et al. |
| 2021/0184615 | A1 | 6/2021 | Uno et al. |

FOREIGN PATENT DOCUMENTS

| | | | | |
|---|---|---|---|---|
| DE | 1638341 | A | 5/1971 | |
| DE | 10210099 | A1 | 10/2003 | |
| EP | 2451064 | B1 * | 6/2019 | ............ H02M 3/155 |
| WO | 2014206463 | A1 | 12/2014 | |

OTHER PUBLICATIONS

Keping You, Over-voltage Protection Using Power Zener Diode for Matrix Converter and Matrix-Z-source Converter, Nov. 2009, 2009 PEDS conference, DOI: 10.1109/PEDS.2009.5385725 (Year: 2009).*

* cited by examiner

VOLTAGE BOOSTER AND VOLTAGE BOOSTER SYSTEM

CROSS-REFERENCE TO RELATED APPLICATION

This application claims priority to German Patent Application No. 102023108367.8 filed on Mar. 31, 2023, the content of which is incorporated by reference herein in its entirety.

TECHNICAL FIELD

The implementation generally relates to circuits configured to boost voltages and more precisely to reducing the size of and number of components of such circuits.

BACKGROUND

Voltage boosters typically rely on a combination of inductors, switches and capacitors to boost an input voltage to a desired output voltage based on energy induced in the inductors and transferred, based on the switching of the switches, to the capacitors. An example of such a voltage booster is illustrated in FIG. 1, which shows a symmetrical voltage booster 100.

Symmetrical voltage booster 100 includes two inductors 111 and 113 arranged at an input side 110, two switches 121S and 122S and two capacitors 132 and 133 arranged at an output side 130. Given that switches 121S and 122S are protected against potentially damaging voltage drops due to being clamped to a middle point of the output voltage of symmetrical voltage booster 100, symmetrical voltage booster 100 is commonly used in various applications, such as photovoltaic applications.

However, symmetrical voltage booster 100 has separate ground potentials at input side 110 and at output side 130, as indicated by input ground 114 and output ground 135, which may lead to common mode noise. In order to suppress the common mode noise, symmetrical voltage booster 100 relies on both inductors 111 and 113. Given that inductors are the largest components in a voltage booster, having two inductors in a voltage booster increases the size, weight and thereby cost of the voltage booster.

Furthermore, while the size of inductors 111 and 113 could be reduced if symmetrical voltage booster 100 were operated at higher frequencies, the higher operating frequencies would lead to an increase in common mode noise. Since such an increase in common mode noise is inacceptable, operating symmetrical voltage booster 100 at higher frequencies to reduce the size of inductors 111 and 113 is not possible.

Therefore, it is an objective of the present disclosure to provide an improved voltage booster which reduces the number and size of the required inductors while providing a level of protection of switches in a voltage booster comparable to the level of protection provided by symmetrical voltage boosters.

SUMMARY

To achieve this objective, the present disclosure provides a voltage booster. The voltage booster includes an inductor arranged at an input side of the voltage booster, an output capacitor branch including an upper output capacitor and a lower output capacitor arranged in series at an output side of the voltage booster, at least one switching branch, each switching branch including a first upper switch and a first lower switch arranged in series, wherein the at least one switching branch is arranged between the input side and the output side, an upper protection branch arranged between the inductor and the at least one switching branch, the upper protection branch including an upper protection capacitor and an upper protection diode arranged in series, an output voltage rectification branch arranged between the at least one switching branch and the output capacitor branch and a lower protection diode arranged between the at least one switching branch and the output capacitor branch. The upper protection branch is arranged in parallel with the first upper switch. The lower protection diode is arranged to form a lower protection branch with the lower output capacitor parallel to the first lower switch.

The present disclosure further provides a booster system, which includes a plurality of input sources, a plurality of voltage boosters, each voltage booster being coupled to a corresponding input source of the plurality of input sources, and at least one load coupled to the plurality of voltage boosters. Each voltage booster of the voltage booster system is configured as defined above.

BRIEF DESCRIPTION OF THE DRAWINGS

Examples of the present disclosure will be described with reference to the following appended drawings, in which like reference signs refer to like elements.

It should be understood that the above-identified drawings are in no way intended to limit the present disclosure. Rather, these drawings are provided to assist in understanding the present disclosure. The person skilled in the art will readily understand that aspects of the present implementation shown in one drawing may be combined with aspects in another drawing or may be omitted without departing from the scope of the present disclosure.

DETAILED DESCRIPTION

The present disclosure generally provides a voltage booster with a single inductor, which is configured to be switched at high frequencies. By being configured to be switched at higher frequencies, the single inductor may additionally be decreased in size. To suppress common mode noise while enabling switching at higher frequencies and to provide protection against excessive voltages at the switches of the voltage booster, the voltage booster of the present disclosure includes an upper protection branch and a lower protection branch. To further reduce the number of components of the voltage booster, the lower protection branch shares one of the output capacitors of the output side. In other words, the voltage booster of the present disclosure includes a single inductor, which may be further reduced in size compared to conventional voltage booster topologies based on the higher switching frequencies if needed, while providing protection against excessive voltages at the switches. The reduction in size of the voltage booster is particularly relevant in booster systems, which may include multiple voltage boosters.

Figure 1:
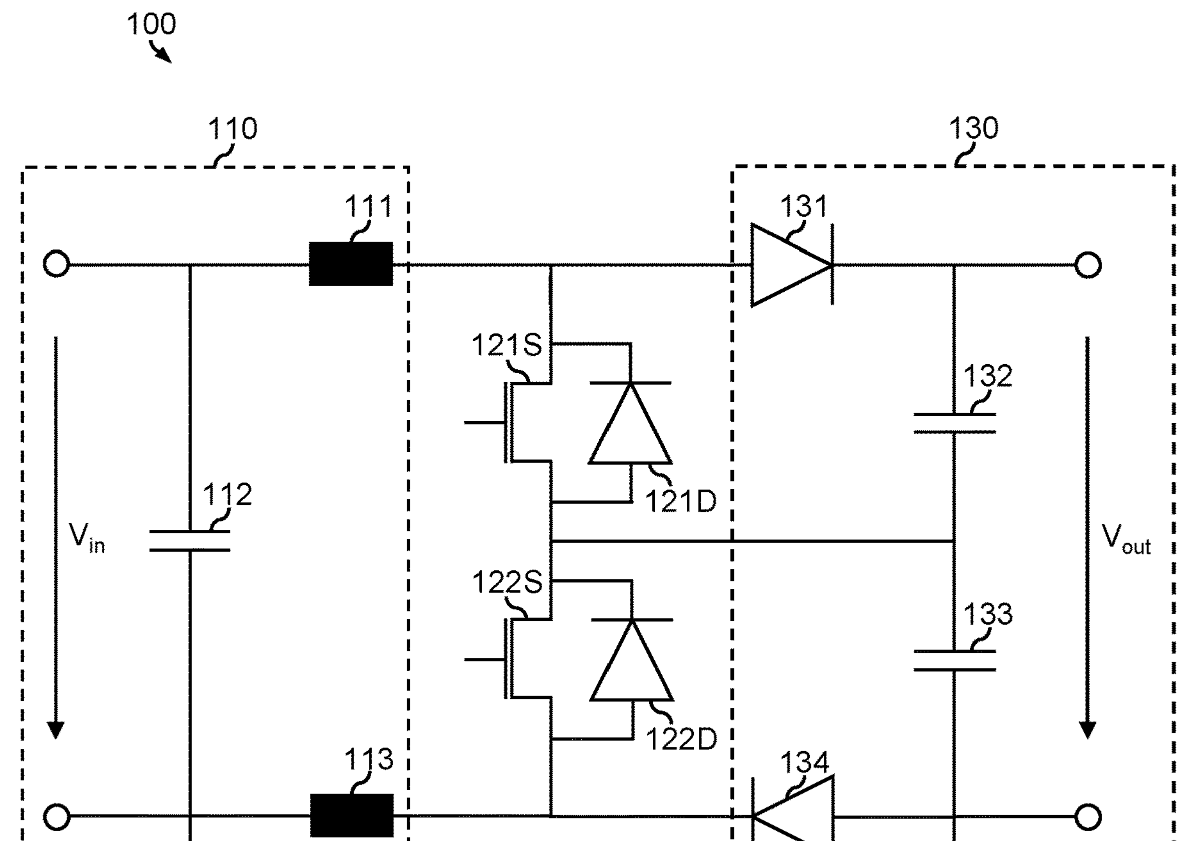
FIG. 1 illustrates a symmetrical booster.
Figure 2:
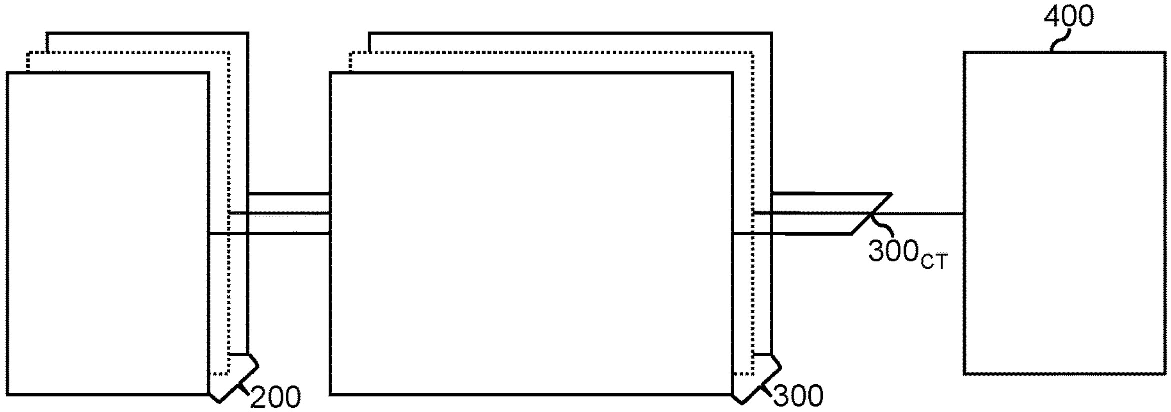
FIG. 2 illustrates a booster system according to examples of the present disclosure.

This general concept will be explained with reference to the appended drawings. FIG. 2 illustrates a booster system, which includes a plurality of voltage boosters. Examples of a voltage booster of the booster system are illustrated in FIGS. 3A to 3G. FIGS. 4A to 4D provide examples of additional aspects of the voltage booster. Finally, FIGS. 5A to 5E illustrate switching diagrams of the voltage booster.

FIG. 2 illustrates a booster system, which includes a plurality of input sources 200, a plurality of voltage boosters 300 and at least one load 400. Each voltage booster 300 is coupled to a corresponding input source 200. Further, all voltage boosters 300 are collectively coupled to a common output terminal 300*cr*. Common output terminal 300*cr* is configured to be coupled to load 400. Input sources 200 may be, for example, photovoltaic cells or wind turbines, e.g., input sources 200 may be energy generation devices. Load 400 may be, for example, a battery system configured to store energy generated by input sources 200. Alternatively, load 400 may be a direct current to alternating current converter (e.g., a DC-to-AC converter) coupled to a power grid. In other words, load 400 may enable providing the energy generated by input sources 200 to a power grid. More generally, load 400 may enable further processing of the energy generated by input sources 200, e.g., by storing or by enabling transmission of the energy generated by input sources 200. Since the voltage at an output of input sources 200 is too low to be processed at load 400 directly, voltage boosters 300 are coupled between input sources 200 and load 400 in order to increase the voltage to a level which can be processed by load 400. Each voltage booster 300 may be configured in accordance with the principles shown in FIGS. 3A to 3G.

Figure 3A:
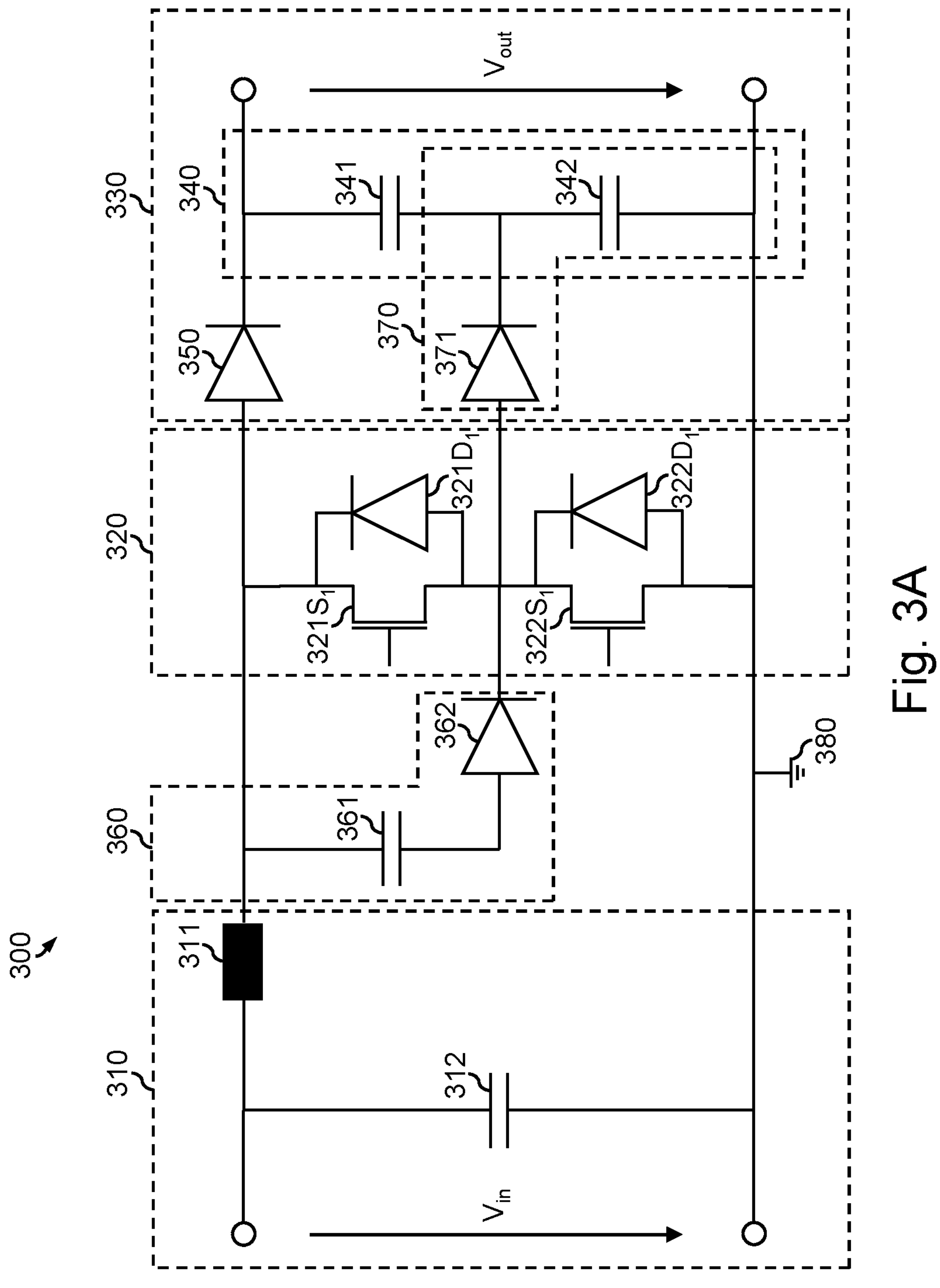
FIGS. 3A to 3G illustrate various implementations of a voltage booster according to examples of the present disclosure.

FIG. 3A illustrates the general principle of voltage booster 300. Accordingly, voltage booster 300 comprises an inductor 311, an output capacitor branch 340, a switching branch 320, an output voltage rectification branch 350, an upper protection branch 360 and a lower protection branch 370.

Inductor 311 is arranged at an input side 310 of voltage booster 300. Inductor 311 may be, for example, implemented as a solenoid inductor with a wire wound a number of times. The number of times the wire is wound may be referred to as the number of windings. Switching of switching branch 320 causes a change in current flow through inductor 311, which generates a magnetic field. The generated magnetic field then causes the induction of energy in inductor 311. The amount of energy which can be induced in inductor 311 based on this principle depends on the inductance of inductor 311 and the switching behavior of switching branch 320. The inductance depends on the implementation of inductor 311, such as, for example, the size and magnetic permeability of the material and the number of windings, as well as a geometry. The induced energy is then transferred to output capacitor branch 340. The transfer of the induced energy causes output capacitor branch 340 to charge and thereby generates an output voltage $V_{out}$ of voltage booster 300 The transfer of the induced energy to output capacitor branch 340 is likewise based on the switching of switching branch 320. The voltage level of the output voltage $V_{out}$ thus depends on the switching behavior of switching branch 320 and the energy which can be induced in inductor 311.

Since voltage booster 300 includes only one inductor 311, input side 310 and output side 330 may share a common ground, as illustrated by common ground 380 in FIGS. 3A to 3G.

Voltage booster 300 may further include an input capacitor 312 at input side 310. Input capacitor 312 may stabilize an input voltage $V_{in}$ of voltage booster 300 and may thereby also stabilize the output voltage $V_{out}$. We note that input capacitor 312 is optional and may be provided external to voltage booster 300.

Output capacitor branch 340 comprises an upper output capacitor 341 and a lower output capacitor 342. Upper output capacitor 341 and lower output capacitor 342 are arranged in series at an output side 330 of voltage booster 300. Upper output capacitor 341 and lower output capacitor 342 are charged by the energy induced at inductor 311 based on the switching behavior of switching branch 320. The charging of upper output capacitor 341 and lower output capacitor 342 causes an increase of the output voltage $V_{out}$. To stabilize the output voltage $V_{out}$, upper output capacitor 341 and lower output capacitor 342 are subsequently discharged at the same time based on the switching behavior of switching branch 320 and recharged again. Following the discharging, upper output capacitor 341 and lower output capacitor 342 are then charged again. In other words, upper output capacitor 341 and lower output capacitor 342 are sequentially charged and discharged. By sequentially charging and discharging upper output capacitor 341 and lower output capacitor 342 at a sufficiently fast switching frequency, which may be, for example, in the range of 1 kHz to 200 kHz, a stable output voltage level of output voltage $V_{out}$ can be achieved. In order for the stabilized output voltage $V_{out}$ to have the intended voltage level, upper output capacitor 341 and lower output capacitor 342 are each configured to have a capacitance enabling a voltage drop during operation of voltage booster 300 which corresponds to half of the intended voltage level of the output voltage $V_{out}$. For example, if the output voltage of voltage booster 300 is to be 1500 V, the voltage drop at each capacitor 341, 342 during charging should be 750 V. To achieve this capacitance, upper output capacitor 341 and lower output capacitor 342 may respectively be formed by a plurality of capacitors coupled in parallel.

The output voltage level of output voltage $V_{out}$ may be considered to be stable if the output voltage level does not deviate by more than a tolerance percentage from the intended voltage level of output voltage $V_{out}$. The tolerance percentage may be, for example, in the range of 1% to 10%. Taking an intended output voltage of 1500 V as an example, the output voltage may be considered stable if the output voltage is in a range between 1350 V and 1650 V. It will be understood that the example values of the tolerance percentage are provided merely as an example and depend on the actual implementation of voltage booster. For example, the tolerance percentage may depend on noise considerations, the implementation of load 400 and the wiring layout between voltage booster 300 and load 400.

Switching branch 320 is arranged between input side 310 and output side 330. Switching branch 320 comprises a first upper switch 321$S_1$ and a first lower switch 322$S_1$ arranged in series. As discussed above, the switching behavior of first upper switch 321$S_1$ and first lower switch 322$S_1$ causes the generation of induced energy at inductor 311 and the transfer of the induced energy to output capacitor branch 340. To this end, first upper switch 321$S_1$ and a first lower switch 322$S_1$ need to be switched at a sufficient switching frequency, which may be, for example, in a range of 1 kHz to 200 kHz.

In addition, first upper switch 321$S_1$ and first lower switch 322$S_1$ need to be able to withstand at least half of the output voltage $V_{out}$, as can be seen in FIG. 3A. For example, if the output voltage level is 1500 V, first upper switch 321$S_1$ and first lower switch 322$S_1$ need to respectively withstand at least 750 V. In other words, first upper switch 321$S_1$ and first lower switch 322$S_1$ may be any kind of switch capable of being switched with the required switching speed and configured to withstand at least half of the output voltage $V_{out}$. To this end, first upper switch 321$S_1$ and first lower switch 322$S_1$ may be any kind of power switch configured to have a high voltage blocking capability, such as 450V, 900V, 1200V or 1800V, and configured to enable switching speeds at least in the range of 1 kHz to 200 kHz. Accordingly, first upper switch 321$S_1$ and first lower switch 322$S_1$ may be, for example, a silicon or silicon carbide (SIC) metal oxide field effect transistor (MOSFET), a silicon or SiC insulated gate bipolar transistor (IGBT) or a Gallium nitride high electron mobility transistor (GaN-HEMT). It will be understood that the voltage blocking capability, the switching speed and the technology types discussed with regard to first upper switch 321$S_1$ and first lower switch 322$S_1$ are merely provided as an example. The present disclosure may be practiced with other voltage blocking capabilities, different switching speeds and other power switch technologies than those mentioned here.

As mentioned above, the amount of energy which can be induced and which determines the output voltage $V_{out}$ depends on the inductance and the switching behavior of switching branch 320. The inductance typically depends on the size of the cross-section of inductor 311 and the number of windings of inductor 311. Using a solenoid inductor as an example, the inductance may be determined as shown in equation (1):

$$L = \frac{\mu_0 * A_g * N^2}{l} \tag{1}$$

In equation (1), L denotes the inductance, $\mu_0$ denotes the permeability of the material of the inductor 311, $A_g$ denotes the cross-sectional area of inductor 311, N denotes the number of windings and I denotes the magnetic path length of inductor 311 It will be understood that equation (1) is merely used to illustrate the dependence of the inductance of inductor 311 on the cross-section of inductor 311 and on the number of windings N. While inductor 311 may be a solenoid inductor, inductor 311 may be any other type of inductor suitable for voltage booster 300. Accordingly, in such examples, equation (1) may be replaced by the equation for the type of inductor used in the implementation of voltage booster 300 in accordance with the present disclosure.

As can be seen, the inductance of inductor 311 determines the size of inductor 311 and thus the size of voltage booster 300. In order to reduce the size of the inductor without decreasing the amount of energy induced in inductor 311, the switching behavior of switching branch 320 needs to be modified, as will be shown in the following.

The switching behavior of switching branch 320 can be described based on two properties, e.g., switching frequency and duty cycle. The duty cycle D may be expressed as shown in equation (2):

$$D = \frac{t_{on}}{T} \tag{2}$$

Figure 5A:
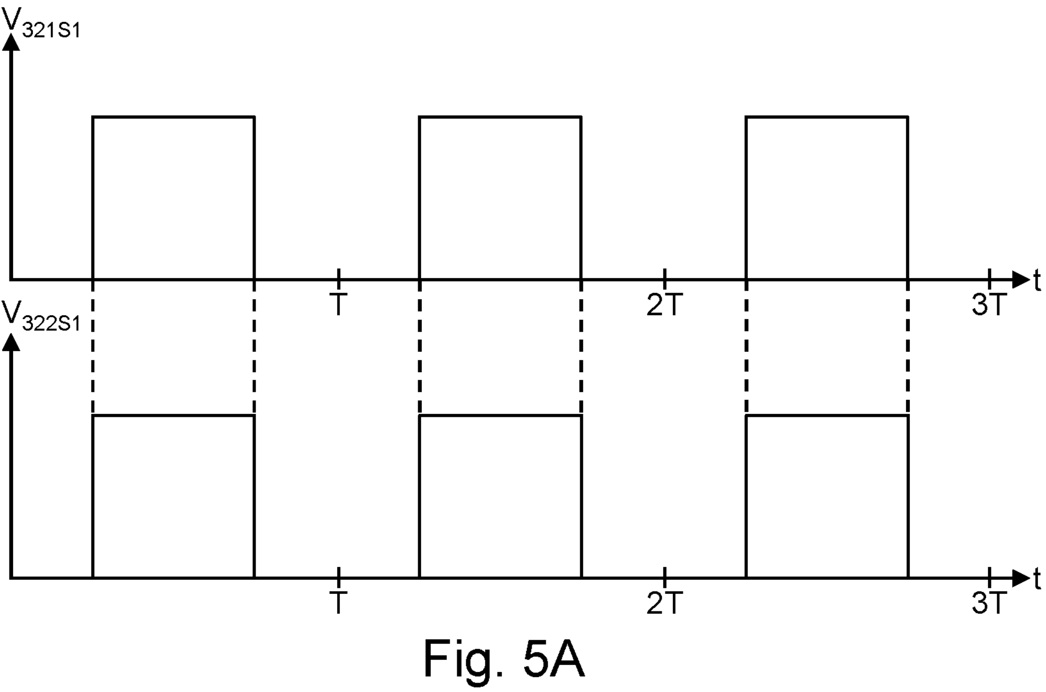
FIGS. 5A to 5E show various switching diagrams of the switches of the voltage booster according to examples of the present disclosure.

In equation (2), on-time $t_{on}$ denotes the time during which first upper switch 321$S_1$ and first lower switch 322$S_1$ are switched on and T denotes a switching period of first upper switch 321$S_1$ and first lower switch 322$S_1$. It will be understood that first upper switch 321$S_1$ and first lower switch 322$S_1$ are switched simultaneously, as illustrated in FIG. 5A by the vertical dashed lines. In other words, first upper switch 321$S_1$ and first lower switch 322$S_1$ may be switched on and off based on substantially the same timing. This may be, for example, achieved by switching first upper switch 321$S_1$ and first lower switch 322$S_1$ using the same gate signal. The switching frequency $f_{sw}$ can be expressed based on switching period T as shown in equation (3):

$$f_{sw} = \frac{1}{T} \tag{3}$$

Based on equation (2), on-time $t_{on}$ can be expressed as shown in equation (4):

$$t_{on} = D * T \tag{4}$$

Analogously to $t_{on}$, an off-time $t_{off}$ can be defined. During off-time $t_{off}$, first upper switch 321$S_1$ and first lower switch 322$S_1$ are turned off. In other words, off-time $t_{off}$ corresponds to the time of switching period T during which first upper switch 321$S_1$ and first lower switch 322$S_1$ are not turned on. Accordingly, off-time $t_{off}$ can be expressed based on equation (2) as shown in equation (5):

$$t_{off} = T - t_{on} = (1 - D) * T \tag{5}$$

Voltage $V_L$ at inductor 311 can be generally expressed according to equation (6):

$$V_L = L * \frac{\Delta I}{\Delta t} \tag{6}$$

In equation (6), current difference ΔI corresponds to a change in current flowing through inductor 311 and time difference Δt corresponds to the time duration during which the current flowing through inductor 311 changes by current difference ΔI. When switching branch 320 is turned on, voltage $V_L$ corresponds to input voltage $V_{in}$. Based on this fact, the current difference ΔI occurring while switching branch 320 is turned on can be expressed based on equation (6) as shown in equation (7):

$$\Delta I = t_{on} * \frac{V_{in}}{L} \tag{7}$$

Further, when switching branch 320 is turned off, voltage $V_L$ corresponds to the difference of the output voltage $V_{out}$ and the input voltage $V_{in}$. Based on this fact, the current difference ΔI occurring while switching branch 320 is turned off can be expressed based on equation (6) as shown in equation (8):

$$\Delta I = t_{[[on]]off} * \frac{V_{out} - V_{in}}{L} \tag{8}$$

Since the current difference ΔI is to be the same in order to provide a constant average current when switching branch 320 is turned on and off, respectively, equation (7) and equation (8) can be equated. Equating equations (7) and (8) and taking into account equation (4) and equation (5) leads to the equation (9):

$$V_{out} = \frac{V_{in}}{1 - D} \tag{9}$$

Equation (9) thus indicates that the output voltage $V_{out}$ depends on the duty cycle D. In other words, the higher the desired voltage level of output voltage $V_{out}$, the longer the duty cycle D. Further, equation (7) can be rearranged based on equations (3) to (5) to express inductance L as shown in equation (10):

$$L = \frac{V_{in} * D}{\Delta I * f_{sw}} \tag{10}$$

Based on equation (10), it can be seen that inductance L depends on duty cycle D and switching frequency $f_{sw}$, assuming that input voltage $V_{in}$ and current difference ΔI are fixed. Accordingly, inductance L can be reduced in value and thus in size based on equation (1), if duty cycle D is reduced or the switching frequency increased. However, reducing duty cycle D causes a reduction of the output voltage $V_{out}$, as shown in equation (9). Thus, based on voltage booster 300 of FIG. 3A, which includes one switching branch 320, reducing the inductance and thus the size of inductor 311 is achieved based on increasing switching frequency $f_{sw}$.

Figure 3B:
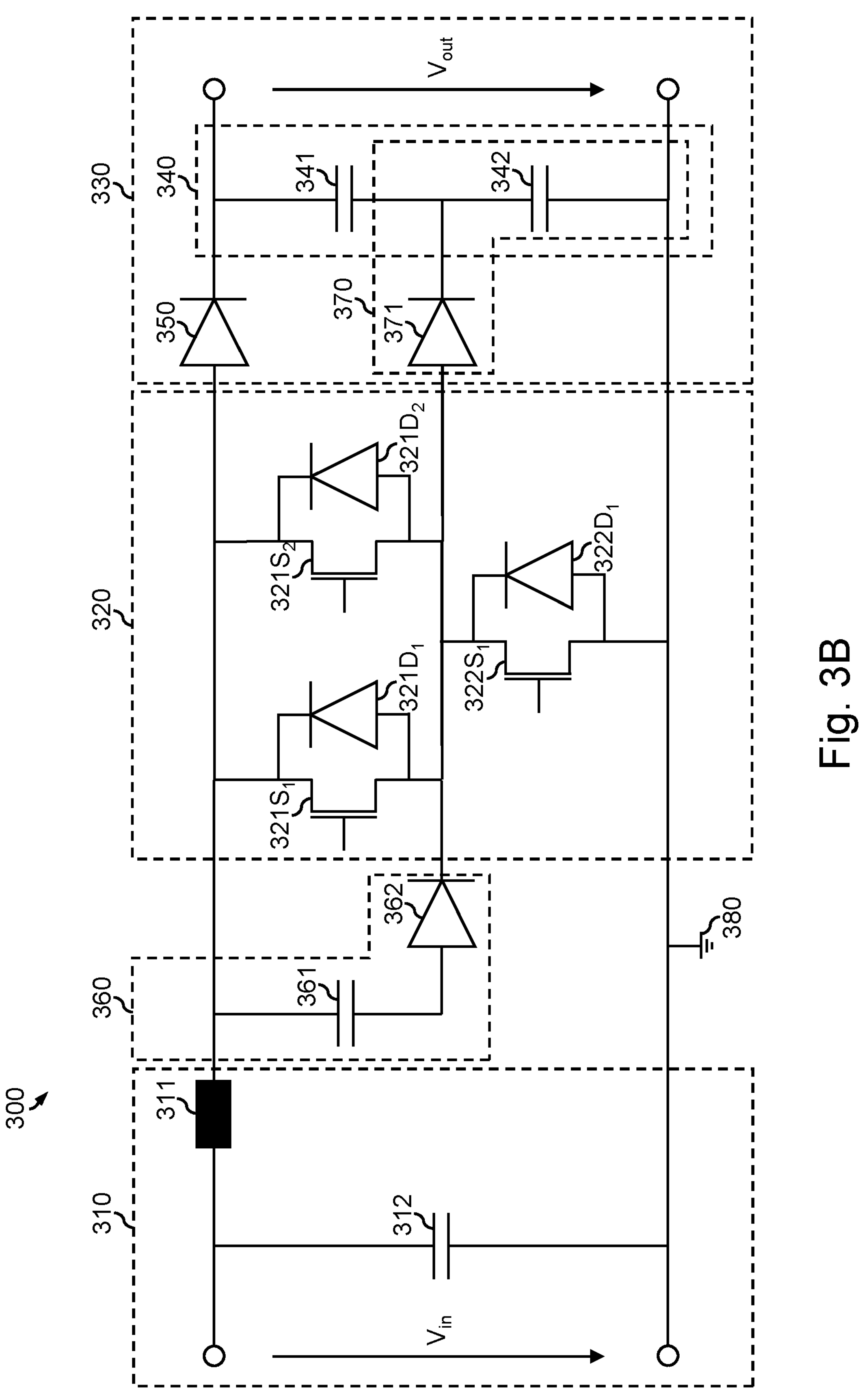
Figure 3C:
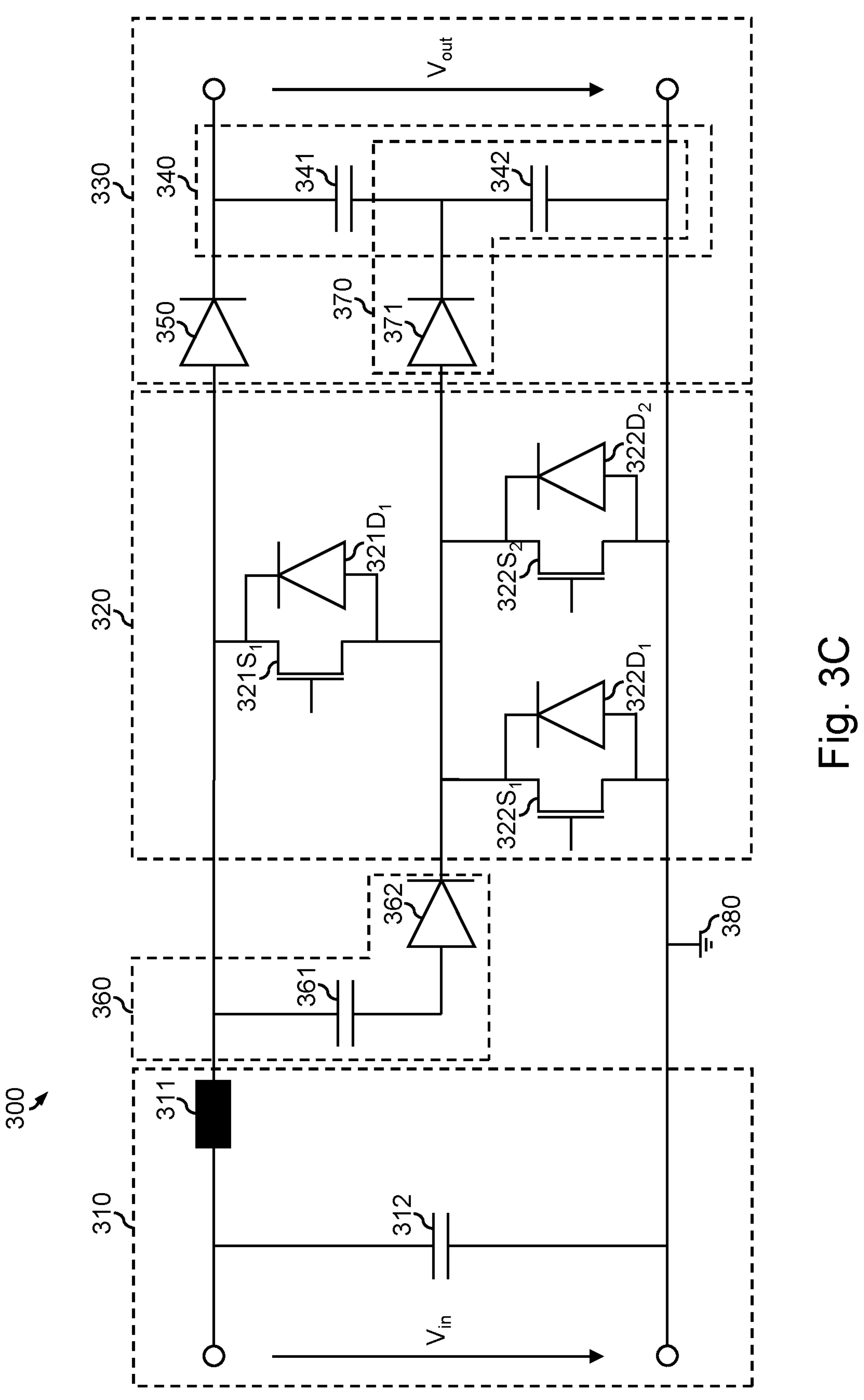
Figure 3D:
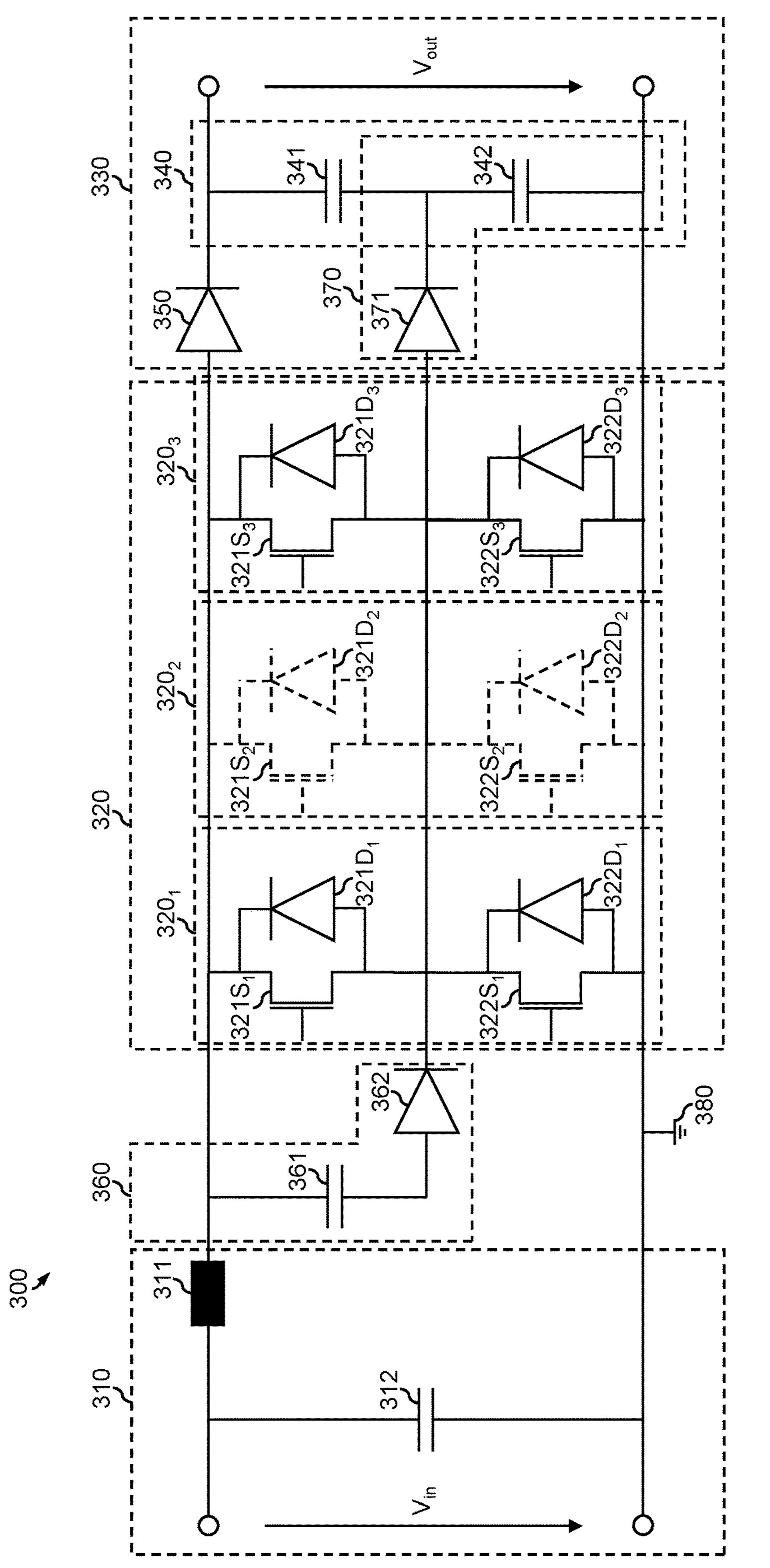

Turning to FIG. 3D, voltage booster 300 may comprise a plurality of switching branches 320, as illustrated by switching branches 320$_1$, 320$_2$ and 320$_3$. It should be noted that FIG. 3D shows three switching branches merely as an example, as indicated by switching branch 320$_2$ illustrated by dashed lines. The plurality of switching branches 320 may include any number of switching branches as warranted by the actual implementation of voltage booster 300 based on the principles of the present disclosure. Like in the case of voltage booster 300 of FIG. 3A, the respective switches of each switching branch 320$_1$, 320$_2$ and 320$_3$ are each switched simultaneously but all switching branches separately, such that only one of the branches is conducting in a respective time interval, as can be seen in FIG. 5E.

Figure 5B:
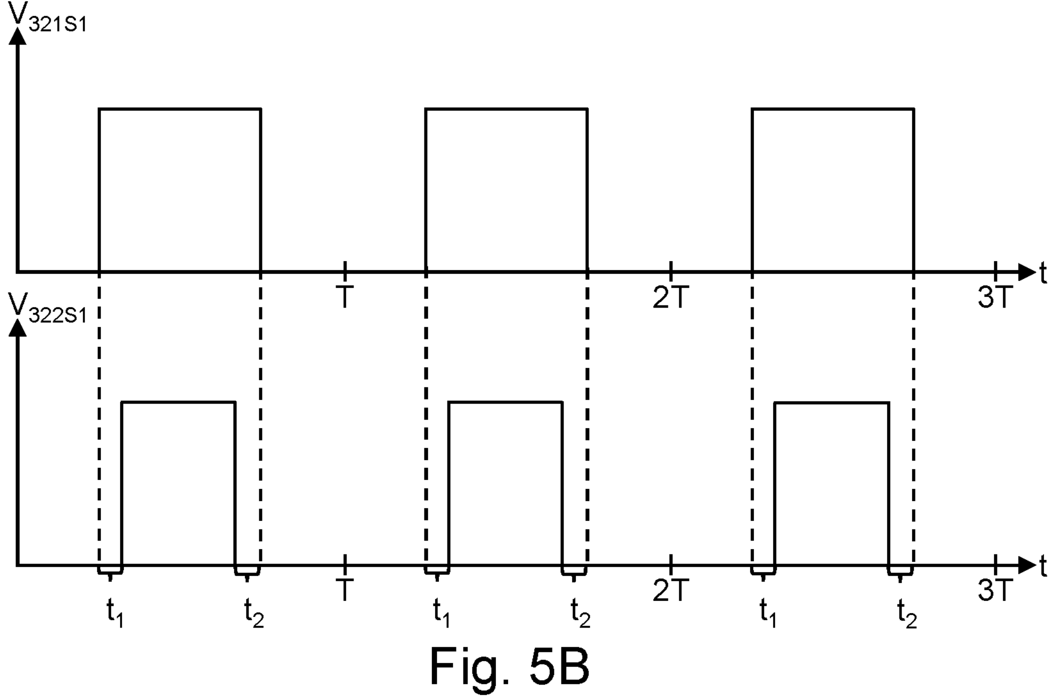
Figure 5C:
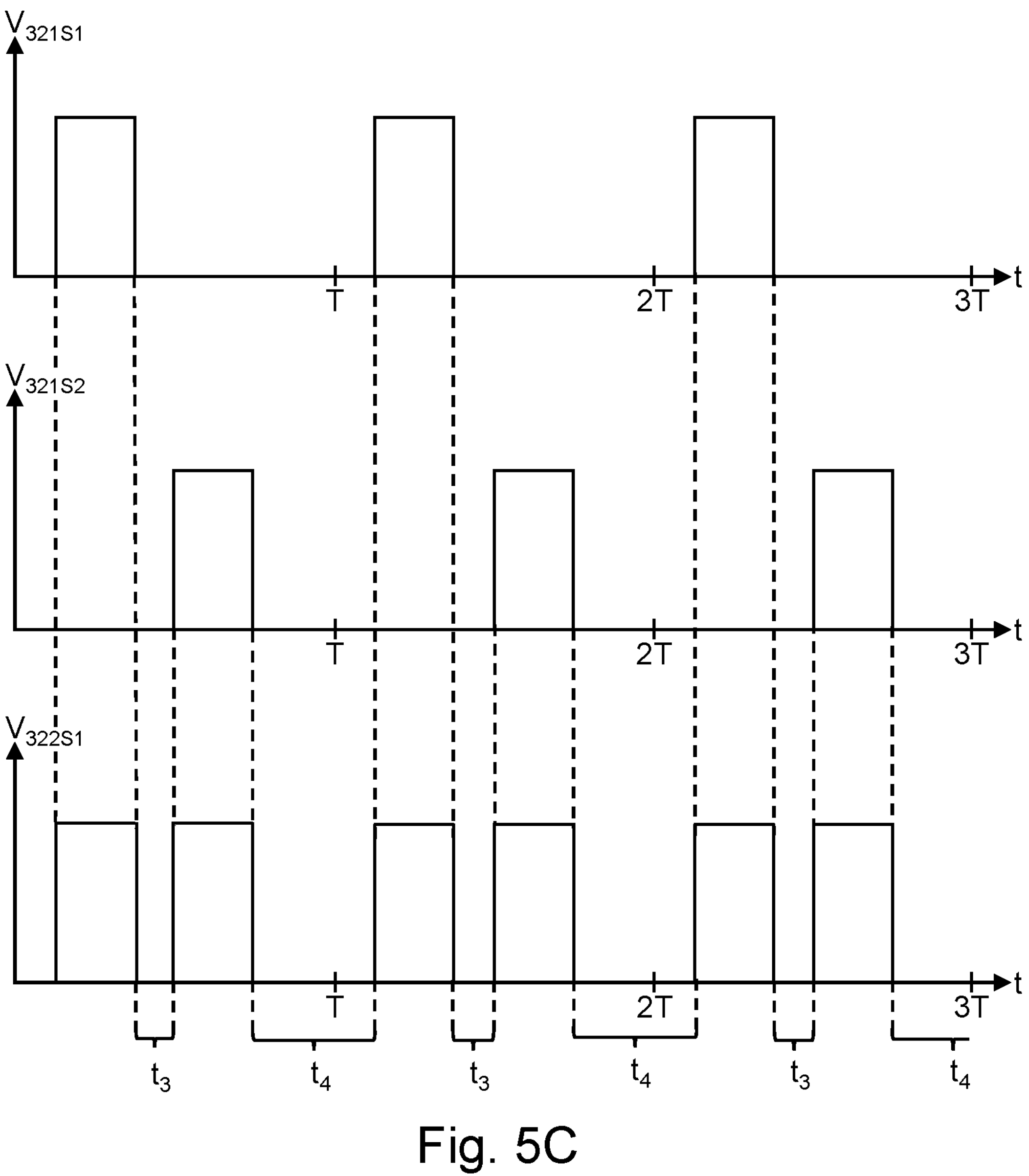
Figure 5D:
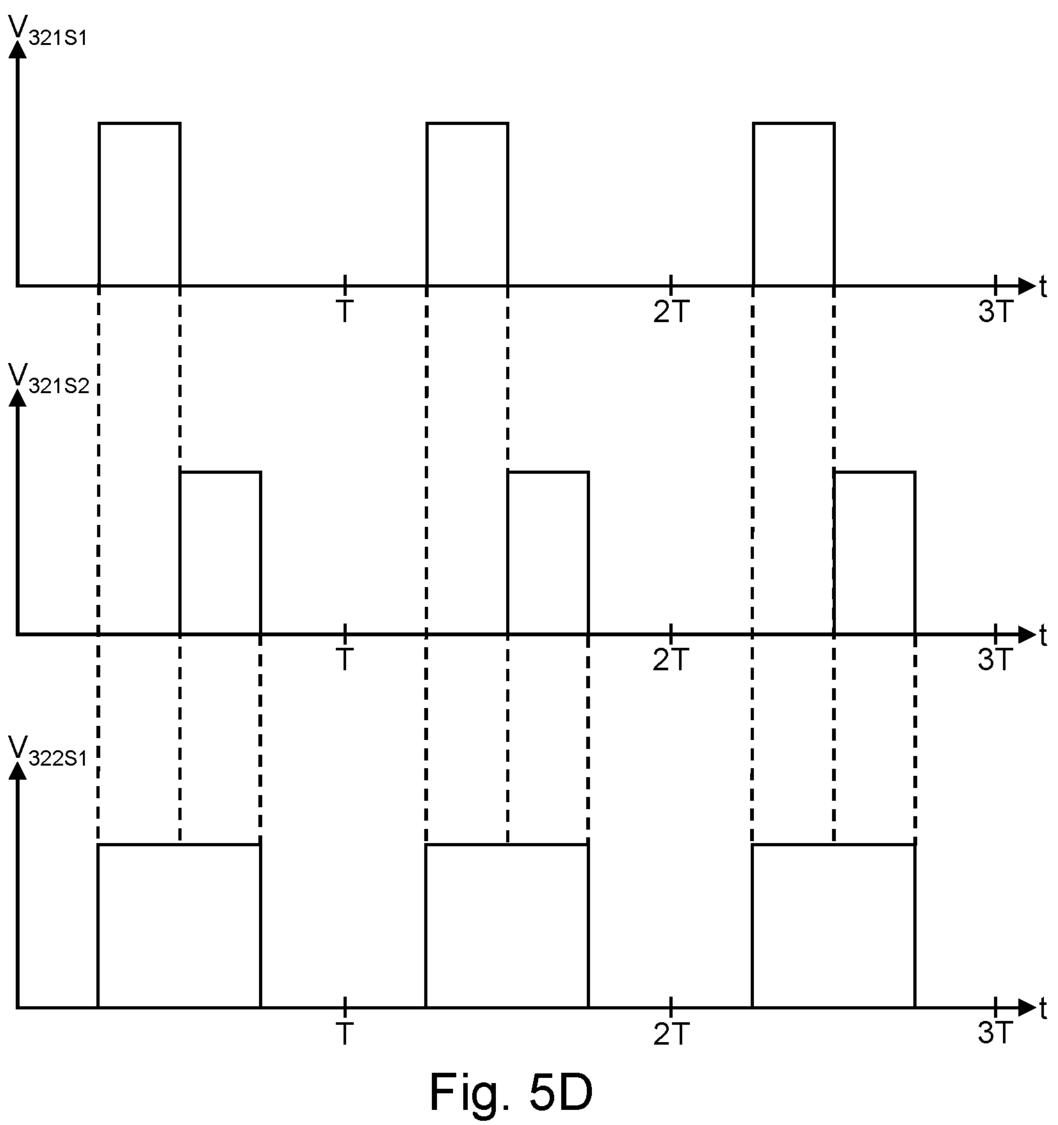
Figure 5E:
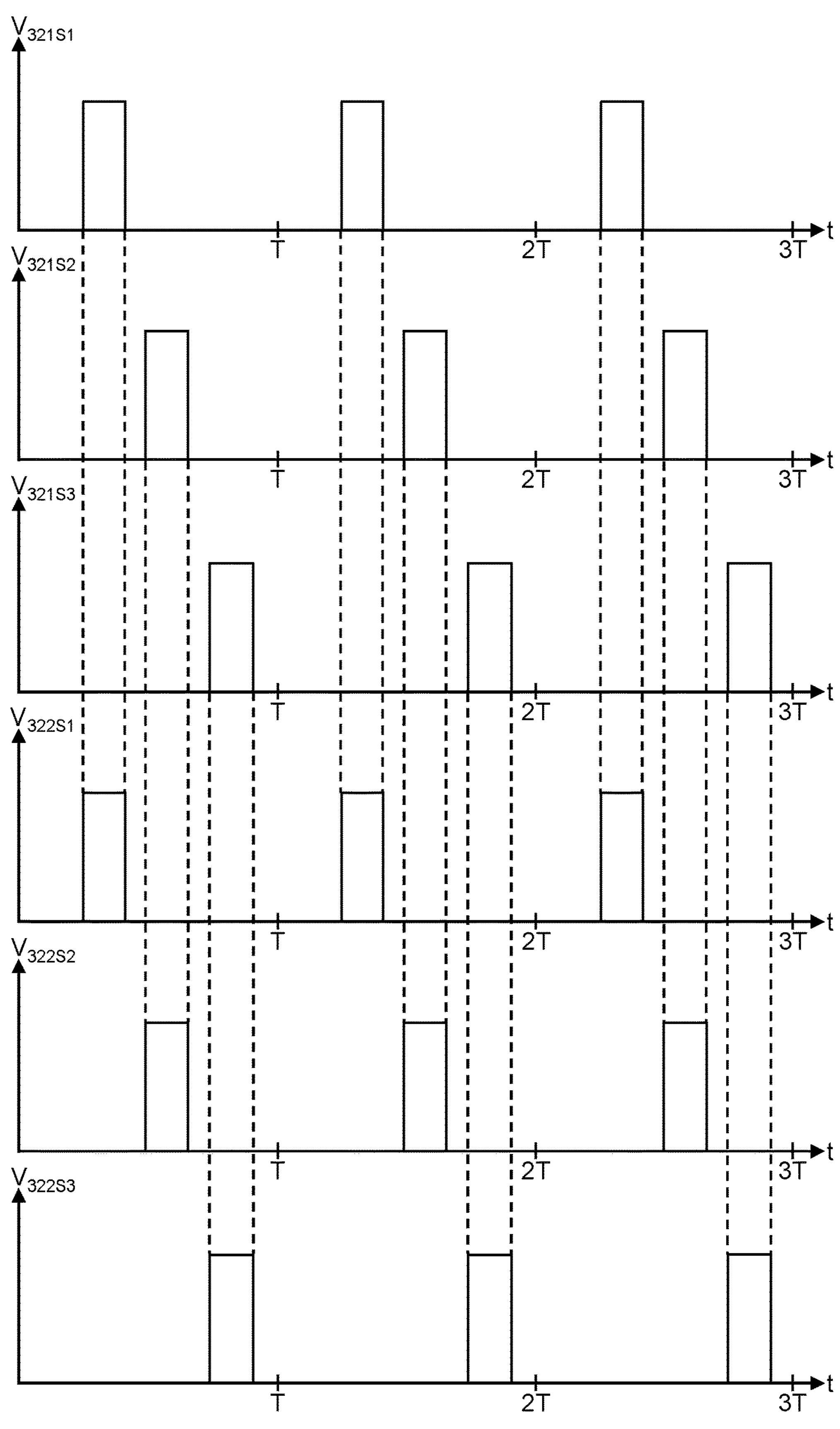

In the case of FIG. 3D and the associated switching diagram in FIG. 5E, off-time $t_{off}$ is the time duration during which all switching branches 320 are turned off. With all branches being turned on one after another for on-time $t_{on}$, equation (5) can be modified to calculate a modified off-time $t_{off,mod}$ as shown in equation (11):

$$t_{off,mod} = T - n * t_{on} = (1 - n * D) * T \tag{11}$$

In equation (11), n denotes the number of switching branches 320 included in the plurality of switching branches. In addition to the modified turn-off time $t_{off,mod}$, the turn-on time $t_{on}$ in the case of the plurality of switching branches is likewise modified, as shown in in equation (12):

$$t_{on,mod} = n * t_{on} \tag{12}$$

Based on equations (11) and (12), equation (9) can be modified as shown in equation (13):

$$V_{out} = \frac{V_{in}}{1 - n * D} \tag{13}$$

As can be seen from equation (13), output voltage $V_{out}$ in the case of voltage booster 300 including a plurality of switching branches 320 depends on both duty cycle D and the number of switching branches. Thus, in this case, based on equation (10) and equation (13), the size of inductor 311 can be modified by increasing switching frequency $f_{sw}$ or by increasing the number n of switching branches 320 while decreasing the duty cycle D per switching branch 320. In the context of the duty cycle D, it will be understood that voltage booster 300 may have a booster duty cycle and each switching branch 320 may have a branch duty cycle. Given the above discussion, each branch duty cycle may correspond to the booster duty cycle divided by the number of switching branches 320.

More precisely, based on equation (1), the size of inductor 311 can be reduced by reducing the size of the cross-sectional area $A_g$, by reducing the number of windings N or by reducing both the cross-sectional area $A_g$ and the number of windings N. If only the cross-sectional area $A_g$ is reduced, the cross-sectional area $A_g$ can be reduced based on the number n of switching branches 320 and the original cross-sectional area $A_{g,original}$ as shown in equation (14):

$$A_g = \frac{A_{g,original}}{n} \tag{14}$$

If only the number of windings N is reduced, the number of windings N can be reduced based on the number n of switching branches 320 and the original the number of windings $N_{original}$ as shown in equation (15):

$$N = \frac{N_{original}}{\sqrt{n}} \tag{15}$$

It will be understood that if both the cross-sectional area $A_g$ and the number of windings N is to be reduced, the reduction of cross-sectional area $A_g$ and the number of windings N corresponds to a percentage of the maximum reduction of the cross-sectional area $A_g$ and the number of windings N shown in in equation (14) and equation (15). More generally speaking, one of the cross-sectional area $A_g$ and the number of windings N is inversely proportional to the number n of switching branches 320.

To summarize the above discussion, if one switching branch 320 is present, as shown in FIG. 3A, the size of inductor 311 can be reduced by increasing the switching frequency $f_{sw}$. If a plurality of switching branches 320 is present, as shown in FIG. 3D, the size of inductor 311 can be reduced by increasing the number n of switching branches, which enables reducing the duty cycle D per switching branch 320.

In addition to reducing the size of inductor 311 based on one switching branch 320 as shown in FIG. 3A or based on a plurality of switching branches 320 as shown in FIG. 3D, the size of inductor 311 may also be reduced based on a switching branch 320 as shown in FIGS. 3B and 3C. In FIG. 3B, switching branch 320 comprises a second upper switch 321$S_2$ arranged in parallel with the first upper switch 321$S_1$. In FIG. 3C, switching branch 320 comprises a second lower switch 322$S_2$ arranged in parallel with first lower switch 322$S_1$. In other words, switching branch 320 may comprise either multiple upper switches in parallel or multiple lower switches in parallel while the lower or upper switch may respectively be a single switch. In such implementations of switching branch 320, the parallel switches may be operated sequentially with a reduced duty cycle while the single switch operates at an increased switching frequency $f_{sw}$ in order to reduce the size of inductor 311. Example switching diagrams corresponding to FIG. 3B are shown in FIGS. 5C and 5D. It will be understood that switching diagrams for the switching branch 320 of FIG. 3C will be similar to the switching diagrams for the switching branch 320 of FIG. 3B with the labels of the switching diagrams amended accordingly.

The switching diagrams of FIG. 5C and FIG. 5D only differ with regard to the time periods between the on-pulses for first upper switch 321$S_1$ and second upper switch 321$S_2$. In FIG. 5C, the on-pulses for first upper switch 321$S_1$ and second upper switch 321$S_2$ are separated by time period $t_3$ and time period $t_4$, as illustrated in the bottom switching diagram of first lower switch 322$S_1$. Time period $t_3$ separates the on-pulse for first upper switch 321$S_1$ from the on-pulse of the second upper switch 321$S_2$. Time period ta separates the on-pulse of the second upper switch 321$S_2$ from the on-pulse for first upper switch 321$S_1$. In FIG. 5D, Time period $t_3$ is set to zero as an example, in order to indicate that time period $t_3$ and time period $t_4$ may be chosen freely based on switching constraints, such as switching speed or switching noise. It will be understood that the same principle applies to the switching diagrams of FIG. 5E, e.g., the switching behavior of example voltage booster 300 including a plurality of switching branches 320.

It will be understood that the principle of having multiple upper or lower switches and a single lower or upper switch, respectively, per switching branch 320 can be applied in the context of multiple switching branches 320 as well. That is, plurality of switching branches 320 may include one or more switching branches 320 each having multiple upper or lower switches and a single lower or upper switch, respectively, as well as one or more switching branches 320 having a single upper switch and a single lower switch.

Output voltage rectification branch 350 is arranged between the one or more switching branches 320 and output capacitor branch 340. Output voltage rectification branch 350 rectifies the output voltage $V_{out}$ by ensuring that output capacitor branch 340 cannot discharge through inductor 311, which would otherwise lead to a change in polarity of the output voltage $V_{out}$ and induction of energy at inductor 311. Output voltage rectification branch 350 may comprise at least one diode in order to rectify the output voltage $V_{out}$. The number of diodes may depend on the output voltage $V_{out}$ as well as a respective blocking voltage of the diodes. For example, if the output voltage $V_{out}$ is 1500 V, output voltage rectification branch 350 may include two diodes with a blocking voltage of 1200 V in order to provide a safety margin. The diodes may be any type of diode, such as a silicon diode or a silicon carbide diode.

Upper protection branch 360 is arranged between inductor 311 and the one or more switching branches 320. More precisely, upper protection branch 360 is arranged in parallel with first upper switch 321$S_1$. Upper protection branch 360 comprises an upper protection capacitor 361 and an upper protection diode 362 arranged in series. Based on protection capacitor 361 and an upper protection diode 362 in parallel with first upper switch 321$S_1$, upper protection branch 360 is configured to protect first upper switch 321$S_1$ by clamping the voltage across first upper switch 321$S_1$ to approximately half of the output voltage $V_{out}$ during operation of voltage booster 300. More precisely, upper protection capacitor 361 may be configured to be charged up to a charge level which corresponds to approximately half of the output voltage $V_{out}$. Based on such a charging behavior of upper protection capacitor 361, upper protection capacitor 361 limits the voltage across first upper switch 321$S_1$ to approximately half of the output voltage $V_{out}$. It will be understood that the voltage rating of first upper switch 321$S_1$ may include a safety margin by having a voltage rating higher than half the output voltage $V_{out}$. For example, first upper switch 321$S_1$ may have a voltage rating of 950 V in an example voltage booster 300 having an output voltage $V_{out}$ of 1500 V. In such an example, upper protection capacitor 361 may be configured to limit the voltage across first upper switch 321$S_1$ based on the charging behavior of upper protection capacitor 361 to e.g., 900 V. In other words, upper protection capacitor 361 is configured to clamp the voltage across first upper switch 321$S_1$ to at least approximately half the output voltage $V_{out}$ and may be configured to clamp the voltage across first upper switch 321$S_1$ to a higher voltage if the voltage rating of first upper switch 321$S_1$ is higher than approximately half the output voltage $V_{out}$. In order to prevent upper protection capacitor 361 from discharging through first upper switch 321$S_1$ and thereby inadvertently damage first upper switch 321$S_1$, upper protection capacitor 361 is arranged in series with upper protection diode 362. Protection diode 362 is connected with its anode to upper protection capacitor 361 and is connected with its cathode to switching branch 320, e.g., a node on switching branch 320 arranged between the first upper switch 321$S_1$ and the first lower switch 322$S_1$.

By clamping the voltage across first upper switch 321$S_1$ to at least approximately half of the output voltage $V_{out}$ and thereby preventing potentially damaging overvoltages across first upper switch 321$S_1$, upper protection branch 360 enables the switching behavior of switching branch 320 discussed above and thereby enables the reduction in size of inductor 311.

Upper protection branch 360 may further comprise a voltage management branch 363. As illustrated in FIG. 3G, voltage management branch 363 may be arranged in parallel with upper protection capacitor 361. Voltage management branch 363 may be configured to limit a voltage drop at upper protection capacitor 361 to a protection threshold. The protection threshold may correspond to at least half of an output voltage of the voltage booster. Accordingly, voltage management branch 363 may additionally protect upper switch 321$S_1$ by limiting the voltage across upper switch 321$S_1$ to at least half of an output voltage of the voltage booster by limiting the voltage drop at upper protection capacitor 361. Accordingly based on the discussion of upper protection capacitor 361, it will be understood that the protection threshold may be higher if the voltage rating of upper switch 321$S_1$ is higher than half of the output voltage $V_{out}$. For example, voltage management branch 363 may prevent an overvoltage at upper protection capacitor 361 and thereby at upper switch 321$S_1$ during start-up of voltage booster 300. It will be understood that voltage management branch 363 may be omitted if the additional protection provided by voltage management branch 363 is not required, for example if voltage overshoots during start-up are not an issue for the actual implementation of voltage booster 300 in accordance with the principles of the present disclosure.

Figure 4A:
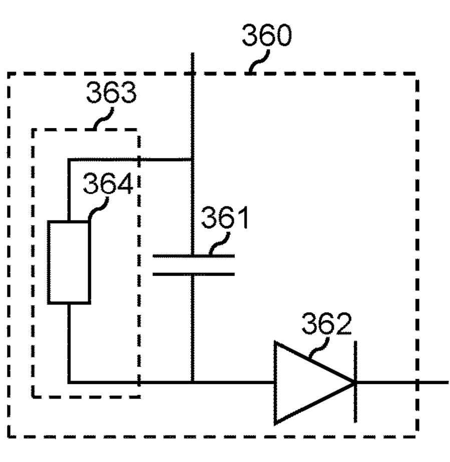
FIGS. 4A to 4D illustrate various example voltage management branches of the voltage booster of FIG. 3G according to examples of the present disclosure.
Figure 4B:
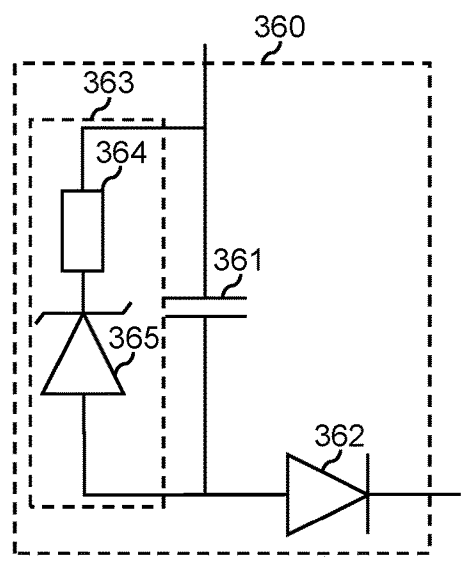
Figure 4C:
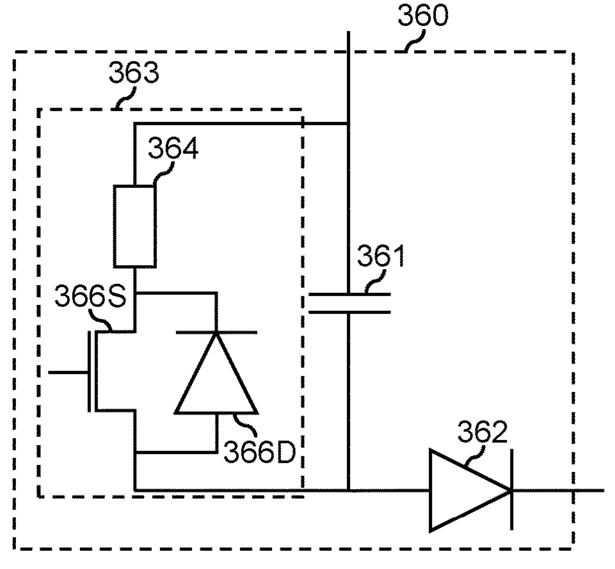
Figure 4D:
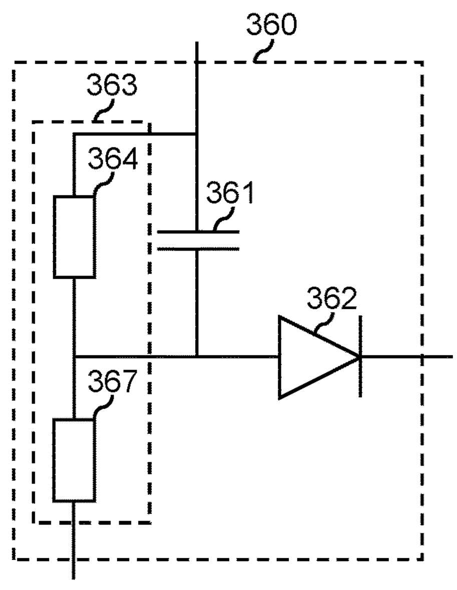

Examples of upper protection branch 360 including voltage management branch 363 are shown in FIGS. 4A to 4D. FIG. 4A illustrates voltage management branch 363 as including a resistor 364. In this example, the voltage drop at upper protection capacitor 361 is thus limited by the voltage drop at resistor 364. FIG. 4B illustrates voltage management branch 363 as including resistor 364 and a Zener diode 365 arranged in series. In this example, the voltage drop at upper protection capacitor 361 is thus limited by the Zener voltage of Zener diode 365. The Zener voltage may correspond to the protection threshold. FIG. 4C illustrates voltage management branch 363 as including a voltage management switch 366S and resistor 364 arranged in series. Voltage management switch 366S may be controlled based on a comparison of the voltage drop at upper protection capacitor 361 with the protection threshold. In this example, the voltage drop at upper protection capacitor 361 is thus limited by the voltage drop at resistor 364 once the voltage management switch is turned on due to the voltage drop increasing above the protection threshold. Thus, the voltage management switch may be configured to turn on in response to the voltage drop increasing above the protection threshold. FIG. 4D illustrates voltage management branch 363 as including resistor 364 and a resistor 367, which together form a voltage divider. In this example, the voltage drop at upper protection capacitor 361 is again limited by the voltage drop at resistor 364 as determined by the voltage divider.

Lower protection branch 370 includes a lower protection diode 371 arranged between the one or more switching branches 320 and output capacitor branch 340, as shown in FIGS. 3A to 3G. More precisely, the cathode of lower protection diode 371 is coupled to the middle point of output capacitor branch 340. Based on this arrangement, lower protection diode 371 and lower output capacitor 342 are arranged to form lower protection branch 370. In other words, lower protection branch 370 may be considered as comprising lower protection diode 371 and lower output capacitor 342. Lower output capacitor 342 thus serves a dual purpose as part of both output capacitor branch 340 and lower protection branch 370. This arrangement accordingly reduces the component count of voltage booster 300.

Based on the arrangement of lower protection branch 370 described above, lower protection branch 370 is arranged parallel to first lower switch 322$S_1$. Since lower protection branch 370 includes components similar to upper protection branch 360 and is likewise arranged parallel to a switch of switching branch 320, lower protection branch 370 is configured to provide the same functionality to lower switch 322$S_2$ as is provided by upper protection branch 360 to first upper switch 321$S_1$. In other words, lower protection branch 370 is configured to prevent a voltage across first lower switch 322$S_2$ to at least approximately half of the output voltage $V_{out}$ based on the same principles discussed above with regard to upper protection branch 360. Accordingly, lower protection branch 370 may also include a voltage management branch in some implementations of voltage booster 300 according to the present disclosure.

While FIGS. 3A to 3G illustrate voltage booster 300 as including one upper protection branch 360 and one lower protection branch 370, voltage booster 300 may include more than one upper protection branch 360 and one lower protection branch 370. For example, voltage booster 300 may include multiple upper protection branches 360 and/or multiple lower protection branches 370. For example, voltage booster 300 may include one upper protection branch 360 for each upper switch 321$S_1$, 321$S_2$ and 321$S_3$, or may include multiple upper protection branches 360, each one of which protects respective groups of upper switches. Likewise, voltage booster 300 may include one lower protection branch 370 for each lower switch 322$S_1$, 322$S_2$ and 322$S_3$, or may include multiple lower protection branches 370, each one of which protects respective groups of lower switches. Further, each or a subset of the multiple upper protection branches 360 and/or multiple lower protection branches 370 may include one voltage management branch 363.

In some embodiments, instead of upper protection diode 362 and/or lower protection diode 371 an active switching element, such as a transistor, may be used in order to reduce conduction losses associated with turn-on and turn-off of the respective diode 362, 371.

In order to further protect the switches of switching branch 320, the simultaneous switching of first upper switch 321$S_1$ and first lower switch 322$S_1$ may be modified, as shown in FIG. 5B. As can be seen in FIG. 5B, first upper switch 321$S_1$ may be configured to be turned on a first time duration $t_1$ before the first lower switch 322$S_1$ is configured to be turned on. Further, first upper switch 321$S_1$ may be configured to be turned off a second time duration $t_2$ after first lower switch 322$S_1$ may be configured to be turned off. Modifying the switching of first upper switch 321$S_1$ and first lower switch 322$S_1$ based on first time duration $t_1$ and second time duration $t_2$ may ensure that first lower switch 322$S_1$ is not turned on before first upper switch 321$S_1$ and is not turned off after first upper switch 321$S_1$. If both first upper switch 321$S_1$ and first lower switch 322$S_1$ are switched simultaneously on and off, as for example indicated in FIG. 5A by the vertical dashed lines, lower switch 322$S_1$ may be inadvertently turned on before first upper switch 321$S_1$ or turned off after first upper switch 321$S_1$ due to an inherent switching speed mismatch. If this occurs, upper protection capacitor 361 may be overcharged via a charging path formed by upper protection capacitor 361, upper protection diode 362 and first lower switch 322$S_1$. This overcharging may lead to a voltage across first upper switch 321$S_1$ exceeding the voltage rating of first upper switch 321$S_1$. Accordingly, the switching of first upper switch 321$S_1$ and first lower switch 322$S_1$, or more generally of switches of each switching branch 320, may be modified by first time duration $t_1$ and second time duration $t_2$. Accordingly, the switching modification of FIG. 5B may be applied to the switching diagrams of FIGS. 5C to 5E. It will be understood that one or both of first time duration $t_1$ and second time duration $t_2$ may be set to zero or may be omitted if switching speed mismatch is not an issue in the case of the switches used in an actual implementation of voltage booster 300 in accordance with the principles of the present disclosure.

Based on FIG. 5A to FIG. 5E, it will be understood that a method for switching voltage booster 300 includes simultaneously switching first upper switch 321$S_1$ and first lower switch 322$S_1$. In other words, first upper switch 321$S_1$ and first lower switch 322$S_I$ may be switched based on the same or essentially the same signal. As discussed with regard to FIG. 5B, simultaneously switching first upper switch 321$S_1$ and first lower switch 322$S_1$ may include turning on first upper switch 321$S_1$ a first time duration $t_1$ before turning on first lower switch $322S_1$. Further, simultaneously switching first upper switch $321S_1$ and first lower switch $322S_1$ may include turning off first upper switch $321S_1$ a second time duration $t_2$ after turning off first lower switch $322S_1$. In other words, the on-duration of a signal provided to first lower switch $322S_1$ may be delayed and shortened with regard to an on-duration of a signal provided to first upper switch $321S_1$. Further, in implementations of voltage booster 300 including multiple upper switches $321S_1$ and $321S_2$ or multiple lower switches $322S_1$ and $322S_2$ in switching branch 320, the method for switching voltage booster 300 may include simultaneously switching each of multiple upper switches $321S_1$ and $321S_2$ together with first lower switch $322S_1$ or each of multiple lower switches $322S_1$ and $322S_2$ together with first upper switch $321S_1$, for example illustrated in FIGS. 5C and 5D.

Figure 3E:
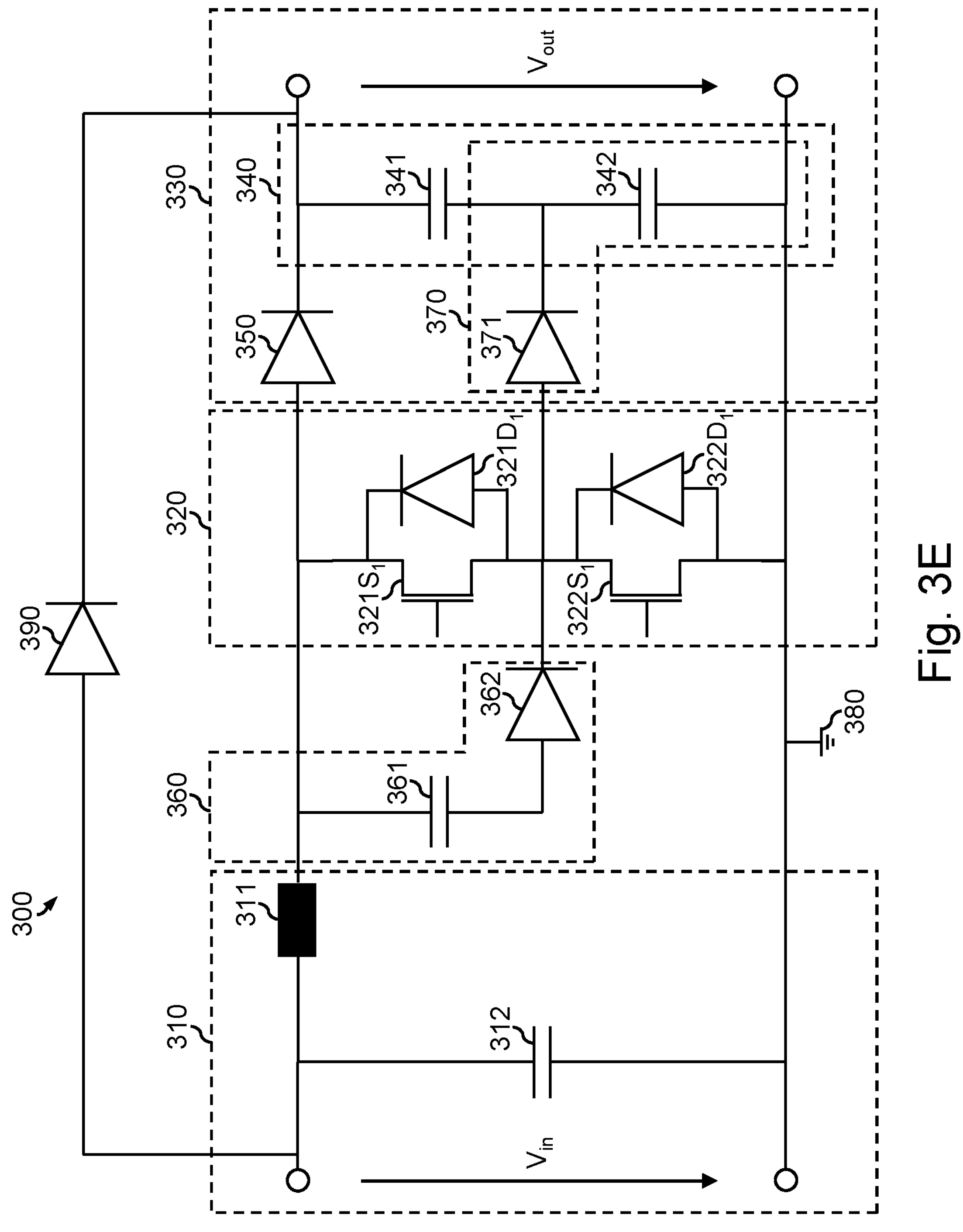
Figure 3F:
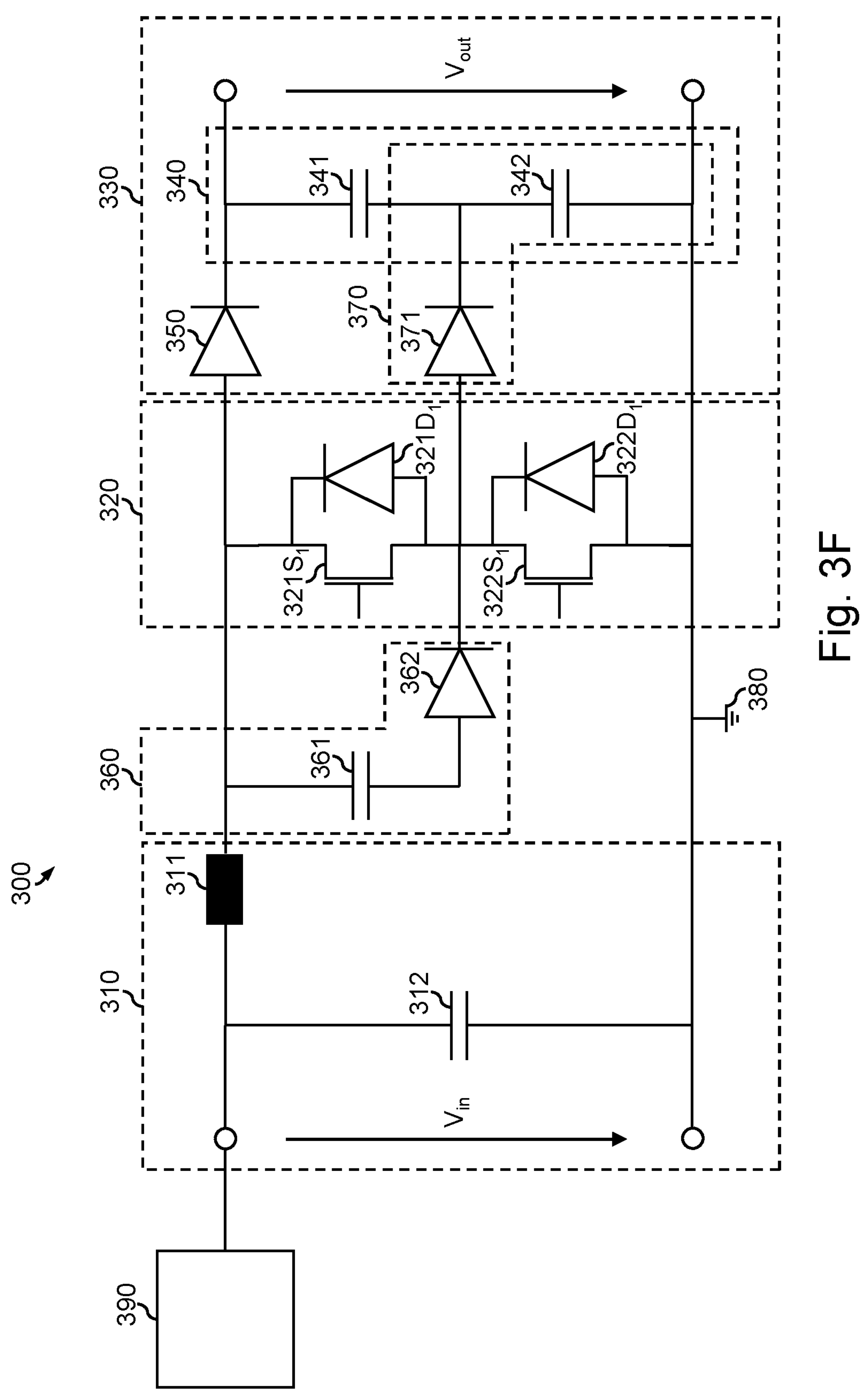
Figure 3G:
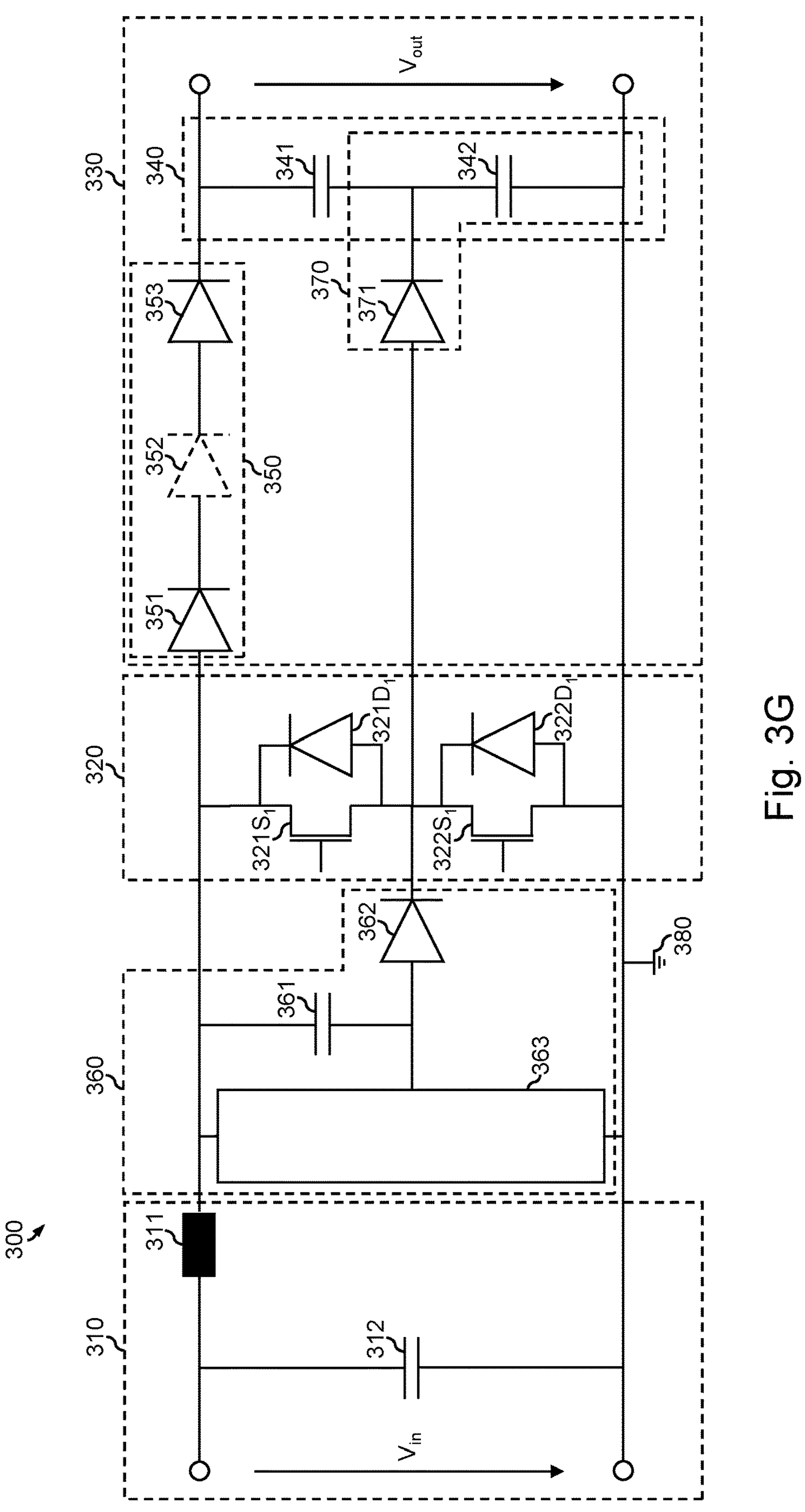

Voltage booster 300 may further comprise an inrush current suppression branch 390, as illustrated in FIGS. 3E and 3F. Inrush current suppression branch 390 may be configured to suppress an inrush current at input side 310. Such an inrush current may for example be provided by one of the input sources 200 of FIG. 2. Accordingly, inrush current suppression branch 390 may at least be arranged at input side 310. As illustrated in FIG. 3E, inrush current suppression branch 390 may be configured as a diode providing a path for the inrush current to bypass voltage booster 300 in order to be dissipated in a load, such as load 400. As illustrated in FIG. 3F, Inrush current suppression branch 390 may be coupled to an input terminal of voltage booster 300 in order to enable dissipation of the inrush current at the input terminal of voltage booster 300.

Aspects

The implementation may further be illustrated by the following aspects.

In an aspect, a voltage booster comprises an inductor arranged at an input side of the voltage booster, an output capacitor branch comprising an upper output capacitor and a lower output capacitor arranged in series at an output side of the voltage booster, at least one switching branch, each switching branch comprising a first upper switch and a first lower switch arranged in series, wherein the at least one switching branch is arranged between the input side and the output side, an upper protection branch arranged between the inductor and the at least one switching branch, the upper protection branch comprising an upper protection capacitor and an upper protection diode arranged in series, an output voltage rectification branch arranged between the at least one switching branch and the output capacitor branch, and a lower protection diode arranged between the at least one switching branch and the output capacitor branch, wherein the upper protection branch is arranged in parallel with the first upper switch, and wherein the lower protection diode is arranged to form a lower protection branch with the lower output capacitor parallel to the first lower switch.

In an aspect, the input side and the output side may share a common ground.

In an aspect, an anode of the upper protection diode is connected to the upper protection capacitor, and a cathode of the upper protection diode is connected to the at least one switching branch.

In an aspect, the at least one switching branch may further comprise a second upper transistor arranged in parallel with the first upper transistor.

In an aspect, the at least one switching branch may further comprise a second lower transistor arranged in parallel with the first lower transistor.

In an aspect, the voltage booster may comprise a plurality of switching branches, and one of a cross-sectional area of the inductor and a number of windings of the inductor may be inversely proportional to a number of switching branches included in the plurality of switching branches.

In an aspect, the voltage booster may have a booster duty cycle, each switching branch of the plurality of switching branches may have a branch duty cycle, and each branch duty cycle may correspond to the booster duty cycle divided by the number of switching branches included in the plurality of switching branches.

In an aspect, the first upper switch may be configured to be turned on a first time duration before the first lower switch is configured to be turned on, and the first upper switch may be configured to be turned off a second time duration after the first lower switch is configured to be turned off.

In an aspect, the output voltage rectification branch comprises at least one diode.

In an aspect, the voltage booster may further comprise an input capacitor at the input side.

In an aspect, the upper protection branch may further comprise a voltage management branch arranged in parallel with the upper protection capacitor, wherein the voltage management branch may be configured to limit a voltage drop at the upper protection capacitor to a protection threshold, the protection threshold corresponding to at least half of an output voltage of the voltage booster.

In an aspect, the voltage management branch may comprise one of a resistor, a voltage divider, a Zener diode and a resistor arranged in series, or a voltage management switch and a resistor arranged in series, wherein the voltage management switch may be configured to turn on upon the voltage drop increasing above the protection threshold.

In an aspect, the voltage booster may further comprise an inrush current suppression branch, wherein the inrush current suppression branch may at least be arranged at the input side.

In an aspect, a booster system comprises a plurality of input sources, a plurality of voltage boosters, each voltage booster being coupled to a corresponding input source of the plurality of input sources, wherein each voltage booster is configured according to any one the preceding aspects, wherein each output side of the plurality of voltage boosters may be coupled to a common output terminal, and wherein the common output terminal may be configured to be coupled to a load.

In an aspect, each input source of the plurality of input sources may be one of a photovoltaic cell or a wind turbine.

In an aspect, the load may be one of a battery system or a direct current to alternating current converter coupled to a power grid.

The preceding description has been provided to illustrate a voltage booster and a booster system. It should be understood that the description is in no way meant to limit the scope of the present disclosure to the precise implementations discussed throughout the description. Rather, the person skilled in the art will be aware that the aspects of the present disclosure may be combined, modified or condensed without departing from the scope of the present disclosure as defined by the following claims.

The invention claimed is:

1. A voltage booster, comprising:
an inductor arranged at an input side of the voltage booster;
an output capacitor branch comprising an upper output capacitor and a lower output capacitor arranged in series at an output side of the voltage booster;
at least one switching branch, each switching branch of the at least one switching branch comprising a first upper switch and a first lower switch arranged in series, wherein the at least one switching branch is arranged between the input side and the output side;
an upper protection branch arranged between the inductor and the at least one switching branch, the upper protection branch comprising an upper protection capacitor and an upper protection diode arranged in series;
an output voltage rectification branch arranged between the at least one switching branch and the output capacitor branch; and
a lower protection diode arranged between the at least one switching branch and the output capacitor branch,
wherein the upper protection branch is arranged in parallel with the first upper switch,
wherein the lower protection diode is arranged to form a lower protection branch with the lower output capacitor parallel to the first lower switch, and
wherein the input side and the output side share a common ground.

2. The voltage booster of claim 1, wherein the at least one switching branch further comprises a second upper switch arranged in parallel with the first upper switch.

3. The voltage booster of claim 1, wherein the at least one switching branch further comprises a second lower switch arranged in parallel with the first lower switch.

4. The voltage booster of claim 1, wherein:
the voltage booster comprises a plurality of switching branches, and
one of a cross-sectional area of the inductor and a number of windings of the inductor is inversely proportional to a number of switching branches included in the plurality of switching branches.

5. The voltage booster of claim 4, wherein:
the voltage booster has a booster duty cycle,
each switching branch of the plurality of switching branches has a branch duty cycle, and
each branch duty cycle corresponds to the booster duty cycle divided by the number of switching branches included in the plurality of switching branches.

6. The voltage booster of claim 1, wherein:
the first upper switch is configured to be turned on a first time duration before the first lower switch is configured to be turned on, and
the first upper switch is configured to be turned off a second time duration after the first lower switch is configured to be turned off.

7. The voltage booster of claim 1, wherein the output voltage rectification branch comprises at least one diode.

8. The voltage booster of claim 1, further comprising an input capacitor at the input side.

9. The voltage booster of claim 1, wherein the upper protection branch further comprises a voltage management branch arranged in parallel with the upper protection capacitor, and
wherein the voltage management branch is configured to limit a voltage drop at the upper protection capacitor to a protection threshold, the protection threshold corresponding to at least half of an output voltage of the voltage booster.

10. The voltage booster of claim 9, wherein the voltage management branch comprises one of:
a resistor;
a voltage divider;
a Zener diode and a resistor arranged in series; or
a voltage management switch and a resistor arranged in series, wherein the voltage management switch is configured to turn on in response to the voltage drop increasing above the protection threshold.

11. The voltage booster of claim 1, further comprising an inrush current suppression branch, wherein the inrush current suppression branch is at least arranged at the input side.

12. A voltage booster, comprising:
an inductor arranged at an input side of the voltage booster;
an output capacitor branch comprising an upper output capacitor and a lower output capacitor arranged in series at an output side of the voltage booster;
at least one switching branch, each switching branch of the at least one switching branch comprising a first upper switch and a first lower switch arranged in series, wherein the at least one switching branch is arranged between the input side and the output side;
an upper protection branch arranged between the inductor and the at least one switching branch, the upper protection branch comprising an upper protection capacitor and an upper protection diode arranged in series;
an output voltage rectification branch arranged between the at least one switching branch and the output capacitor branch; and
a lower protection diode arranged between the at least one switching branch and the output capacitor branch,
wherein the upper protection branch is arranged in parallel with the first upper switch,
wherein the lower protection diode is arranged to form a lower protection branch with the lower output capacitor parallel to the first lower switch, and
wherein an anode of the upper protection diode is connected to the upper protection capacitor and a cathode of the upper protection diode is connected to the at least one switching branch.

13. A booster system, comprising:
a plurality of input sources; and
a plurality of voltage boosters, each voltage booster of the plurality of voltage boosters being coupled to a corresponding input source of the plurality of input sources, wherein each voltage booster comprises:
an inductor arranged at an input side of a voltage booster;
an output capacitor branch comprising an upper output capacitor and a lower output capacitor arranged in series at an output side of the voltage booster, wherein the input side and the output side share a common ground;
at least one switching branch, each switching branch of the at least one switching branch comprising a first upper switch and a first lower switch arranged in series, wherein the at least one switching branch is arranged between the input side and the output side;
an upper protection branch arranged between the inductor and the at least one switching branch, the upper protection branch comprising an upper protection capacitor and an upper protection diode arranged in series;

an output voltage rectification branch arranged between the at least one switching branch and the output capacitor branch; and a lower protection diode arranged between the at least one switching branch and the output capacitor branch, wherein the upper protection branch is arranged in parallel with the first upper switch, and wherein the lower protection diode is arranged to form a lower protection branch with the lower output capacitor parallel to the first lower switch, wherein each output side of the plurality of voltage boosters is coupled to a common output terminal, and wherein the common output terminal is configured to be coupled to a load.

14. The booster system of claim 13, wherein each input source of the plurality of input sources is one of a photovoltaic cell or a wind turbine.

15. The booster system of claim 13, wherein the load is one of a battery system or a direct current to alternating current converter coupled to a power grid.

* * * * *